United States Patent
Takada et al.

(10) Patent No.: US 8,367,269 B2
(45) Date of Patent: Feb. 5, 2013

(54) SEPARATOR UNIT

(75) Inventors: Noriyuki Takada, Tokyo (JP); Kenji Kato, Tokyo (JP); Yoshihiro Tamura, Tokyo (JP); Toshihiko Nonobe, Tokyo (JP)

(73) Assignees: Kabushikikaisha Equos Research, Chiyoda-Ku (JP); Toyota Auto Body Kabushikikaisha, Kariya (JP)

( * ) Notice: Subject to any disclaimer, the term of this patent is extended or adjusted under 35 U.S.C. 154(b) by 923 days.

(21) Appl. No.: 11/370,921

(22) Filed: Mar. 9, 2006

(65) Prior Publication Data

US 2006/0204808 A1    Sep. 14, 2006

(30) Foreign Application Priority Data

Mar. 11, 2005 (JP) ................................. 2005-070036

(51) Int. Cl.
*H01M 8/04* (2006.01)

(52) U.S. Cl. ........ 429/514; 429/513; 429/512; 429/457; 429/456; 429/522

(58) Field of Classification Search ................ 429/12, 429/30, 34, 35, 417, 513, 514, 512, 457, 429/456, 518, 517, 522, 519, 433, 444; *H01M 8/04, H01M 2/14, 2/16, 4/64*
See application file for complete search history.

(56) References Cited

U.S. PATENT DOCUMENTS

| | | | |
|---|---|---|---|
| 3,432,357 A * | 3/1969 | Dankese ........................ | 429/34 |
| 4,548,876 A | 10/1985 | Bregoli | |
| 5,776,624 A | 7/1998 | Neutzler | |
| 5,919,584 A * | 7/1999 | Akagi .............................. | 429/34 |
| 5,972,530 A | 10/1999 | Shelekhin et al. | |
| 6,296,964 B1 | 10/2001 | Ren et al. | |
| 6,406,809 B1 * | 6/2002 | Fujii et al. ...................... | 429/34 |
| 6,410,180 B1 * | 6/2002 | Cisar et al. ................... | 429/481 |
| 6,444,340 B1 * | 9/2002 | Jaffrey ............................ | 429/30 |
| 6,468,681 B1 | 10/2002 | Horiguchi | |
| 6,835,477 B1 | 12/2004 | Brambilla et al. | |
| 6,855,451 B2 * | 2/2005 | Ghosh et al. .................... | 429/39 |
| 7,056,608 B2 | 6/2006 | Lloyd et al. | |
| 7,150,931 B1 | 12/2006 | Jaffrey | |
| 7,776,491 B2 * | 8/2010 | Takada et al. ................. | 429/517 |
| 2003/0082423 A1 | 5/2003 | Kushibiki et al. | |
| 2003/0087140 A1 | 5/2003 | Kikuchi et al. | |

(Continued)

FOREIGN PATENT DOCUMENTS

| | | |
|---|---|---|
| DE | 19517443 | 11/1996 |
| GB | 2240988 | 8/1991 |

(Continued)

*Primary Examiner* — Jennifer Michener
*Assistant Examiner* — Heng CHan
(74) *Attorney, Agent, or Firm* — Bacon & Thomas, PLLC

(57) ABSTRACT

A separator unit inserted into a fuel cell having an electrolyte layer interposed between a fuel electrode and an oxygen electrode is provided with a plate like separator that separates fuel gas supplied to the fuel electrode from oxidizing gas supplied to the oxygen electrode, and a mesh like collector having an opening that forms one of a passage through which the fuel gas flows and a passage through which the oxidizing gas flows. The collector is provided to at least one side of the separator base in abutment against one of the fuel electrode and the oxygen electrode. The separator base has a coolant passage formed therein, through which a coolant is allowed to flow, and an electrode abutment portion of the collector, which abuts against one of the fuel electrode and the oxygen electrode, has an aperture ratio higher than those of other portions of the collector.

4 Claims, 8 Drawing Sheets

U.S. PATENT DOCUMENTS

| | | | |
|---|---|---|---|
| 2004/0137304 A1* | 7/2004 | Tanaka et al. | 429/35 |
| 2004/0200187 A1 | 10/2004 | Warrier et al. | |
| 2005/0164071 A1* | 7/2005 | Horiguchi | 429/38 |
| 2005/0250003 A1 | 11/2005 | Zagaja et al. | |

FOREIGN PATENT DOCUMENTS

| | | | |
|---|---|---|---|
| JP | 05-029009 | | 2/1993 |
| JP | 06-044981 | | 2/1994 |
| JP | 06-338338 | | 12/1994 |
| JP | 07-254424 | | 10/1995 |
| JP | 08-306371 | | 11/1996 |
| JP | 10-247505 | | 9/1998 |
| JP | 10-340734 | | 12/1998 |
| JP | 2002-184422 | | 6/2002 |
| WO | WO 01/48852 | * | 7/2001 |

\* cited by examiner

SEPARATOR UNIT

The disclosure of Japanese Patent Application No. 2005-070036 filed on May 11, 2005 including the specification, drawings and abstract is incorporated herein by reference in its entirety.

BACKGROUND OF THE INVENTION

1. Field of the Invention

The invention relates to a separator unit.

2. Description of the Related Art

A fuel cell that discharges no harmful substance while exhibiting high power generation efficiency has been put into practice as a power generating system for industrial and household use or as a power source for a satellite, spacecraft or the like. Recently, the fuel cell serving as the power source for vehicles like passenger cars, buses, and trucks has been under development. The fuel cell of alkaline solution type, phosphoric acid type, molten carbonate type, solid oxide type, direct methanol type and the like may be employed. However, the proton-exchange membrane type fuel cell is mostly employed as it reacts at a relatively low temperature and is advantageous to downsizing.

In the aforementioned fuel cell, a membrane electrode assembly (MEA) formed by joining two gas diffusion electrodes and a solid polymer electrolyte membrane interposed therebetween is employed. One of the above gas diffusion electrodes serves as a fuel electrode (anode electrode), on which hydrogen gas is supplied as a fuel, decomposing an hydrogen molecule into hydrogen ions (protons) and electrons so that the hydrogen ions permeate the solid polymer electrolyte membrane. The other gas diffusion electrode serves as an oxygen electrode (cathode electrode), on which air is supplied as an oxidizer so that oxygen in the air is combined with the hydrogen ions and electrons, generating water. The above-described electrochemical reaction generates an electromotive force.

The proton-exchange membrane type fuel cell has a stack structure in which a separator is provided on an outer side of the MEA to form a passage for supplying reactant gas including hydrogen gas as the fuel gas, and oxygen as the oxidizer gas. The separator serves to prevent permeation of the reactant gas into adjacent MEAs in the stack direction, and to collect the generated electric current that is brought to the outside. A plurality of unit cells each having the MEA and the separator are stacked to form a fuel cell stack.

In the fuel cell system, the heat energy substantially equivalent to the generated power in each of those cells is generated through the electrochemical reaction. Especially the proton-exchange membrane fuel cell operated at a low temperature is provided with a cooling unit that prevents excessive temperature rise in the respective cells as disclosed in Japanese Patent Application Publication Nos. JP-A-8-306371 and JP-A-10-340734.

In the generally employed fuel cell system as mentioned above, a temperature distribution may occur with respect to the stack direction of the unit cells, thus increasing the temperature of the electrode. In this case, quantity of water that dissipates outside the MEA through the electrode is likely to become excessive, thereby reducing the humidity within the MEA and thus reducing the power generation efficiency in each of the cells.

SUMMARY OF THE INVENTION

It is an object of the invention to provide a separator unit which eliminates the temperature distribution within the fuel cell stack by locally changing the aperture ratio of a collector formed of a porous material to allow appropriate control of the temperature of the fuel cell to appropriately maintain the humidity within the fuel cell, to exhibit high power generation efficiency and cooling capability so as to improve outputs of the fuel cell.

A separator unit according to an aspect of the invention inserted into a fuel cell having an electrolyte layer interposed between a fuel electrode and an oxygen electrode includes a plate like separator base that separates fuel gas supplied to the fuel electrode from oxidizing gas supplied to the oxygen electrode, and a mesh like collector having an opening that forms a passage through which the fuel gas flows or a passage through which the oxidizing gas flows, and the collector is provided to one side or both sides of the separator base in abutment against the fuel electrode or the oxygen electrode. The separator base has a coolant passage formed therein, through which a coolant is allowed to flow, and an electrode abutment portion of the collector, which abuts against one of the fuel electrode and the oxygen electrode, has an aperture ratio higher than those of other portions of the collector.

In the separator unit according to another aspect of the invention, the collector includes a separator abutment portion that abuts against the separator base, and a rib portion between the electrode abutment portion and the separator abutment portion, each aperture ratio of which establishes a relational expression (1): aperture ratio of the electrode abutment portion > aperture ratio of the rib portion $\geqq$ aperture ratio of the separator abutment portion.

The separator unit according to the invention inserted into the fuel cells each formed by interposing the electrolyte layer between the fuel electrode and the oxygen electrode. The separator unit has a coolant passage through which a coolant for cooling the fuel cell flows therein, a plate like separator base that separates gas supplied to the fuel electrode from the gas supplied to the oxygen electrode, and a collector with mesh-like openings attached to one side or both sides of the separator base in abutment against the fuel electrode or the oxygen electrode to radiate the heat generated by the fuel cell. The portion of the collector that abuts against the fuel electrode or the oxygen electrode has the aperture ratio higher than those of other portions of the collector.

In this case, the temperature of the fuel cell may be appropriately controlled by eliminating the temperature distribution within the fuel cell stack. The humidity within the fuel cell, thus, may be appropriately maintained, thereby improving the power generation efficiency. The output of the fuel cell may further be enhanced by improving the cooling capability.

DETAILED DESCRIPTION OF THE PREFERRED EMBODIMENTS

Figure 1:
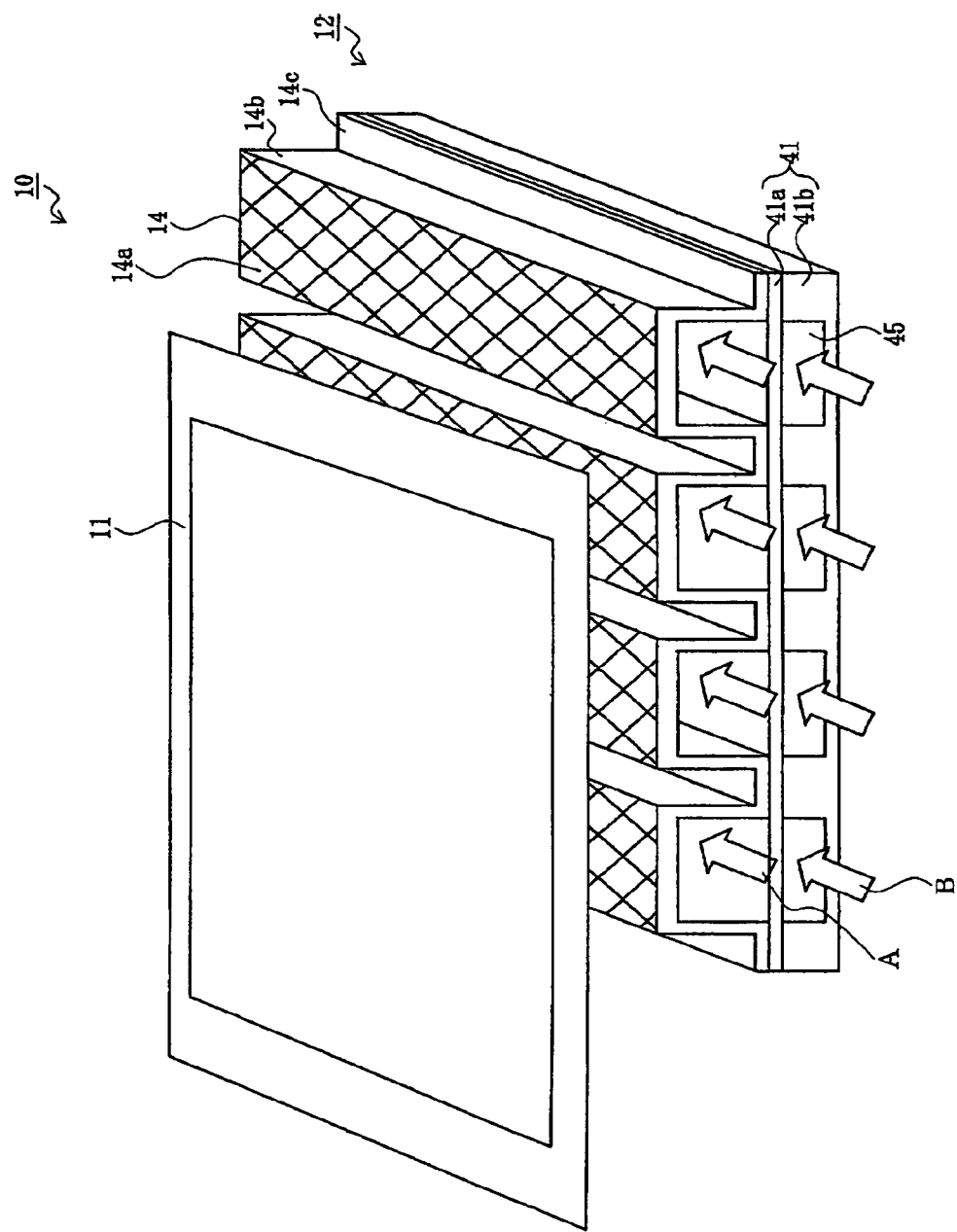
FIG. 1 is a schematic view of a separator unit of a fuel cell system according to a first embodiment of the invention.

Hereinafter, an embodiment of the invention will be described in detail referring to the drawings.

Figure 2:
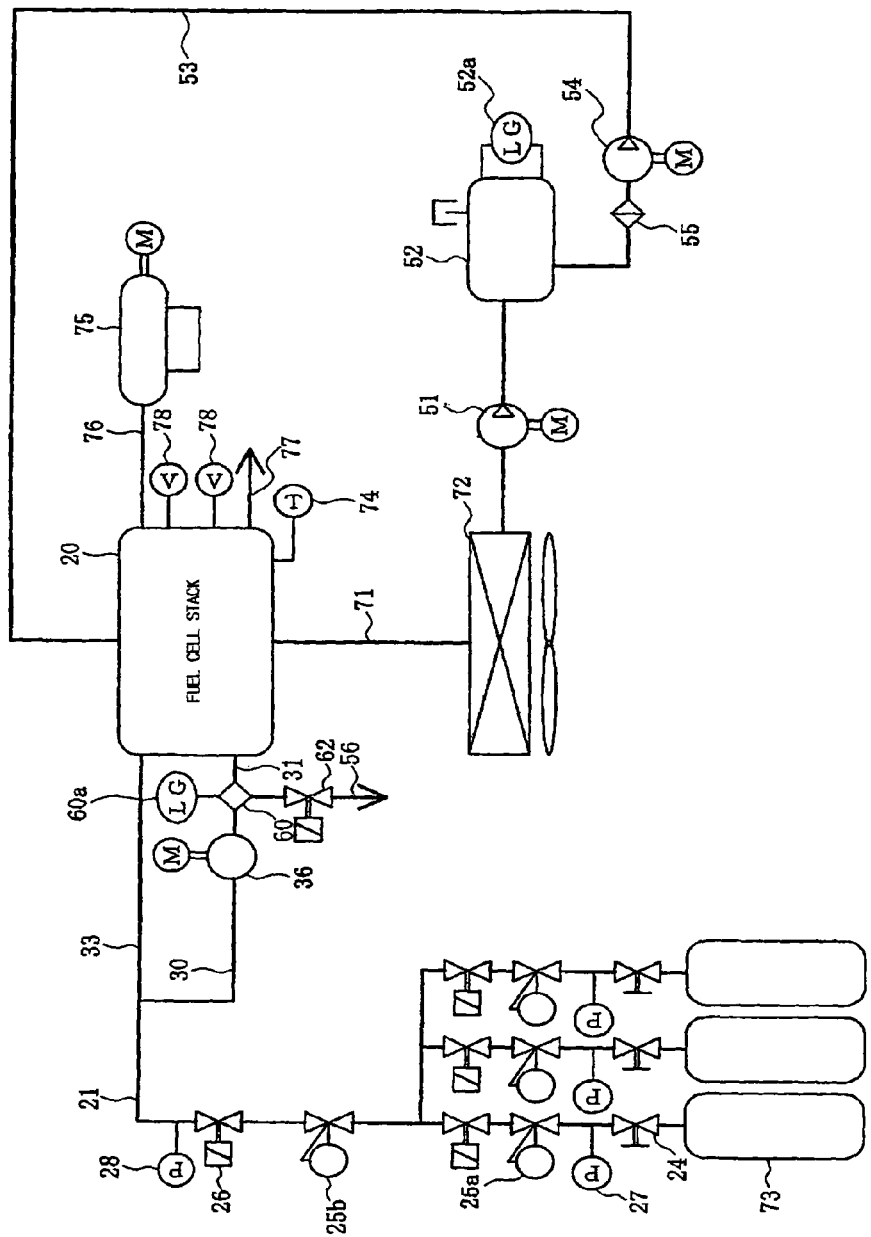
FIG. 2 is a diagram that represents a structure of the fuel cell system according to the first embodiment of the invention.
Figure 3:
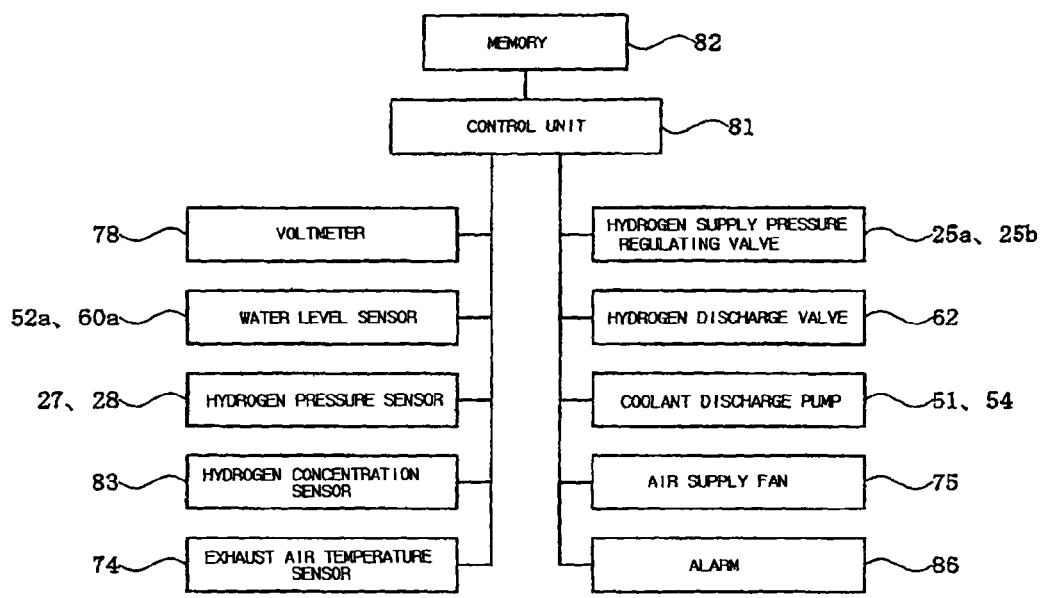
FIG. 3 is a block diagram that represents a structure of a control system of the fuel cell system according to the first embodiment of the invention.
Figure 4:
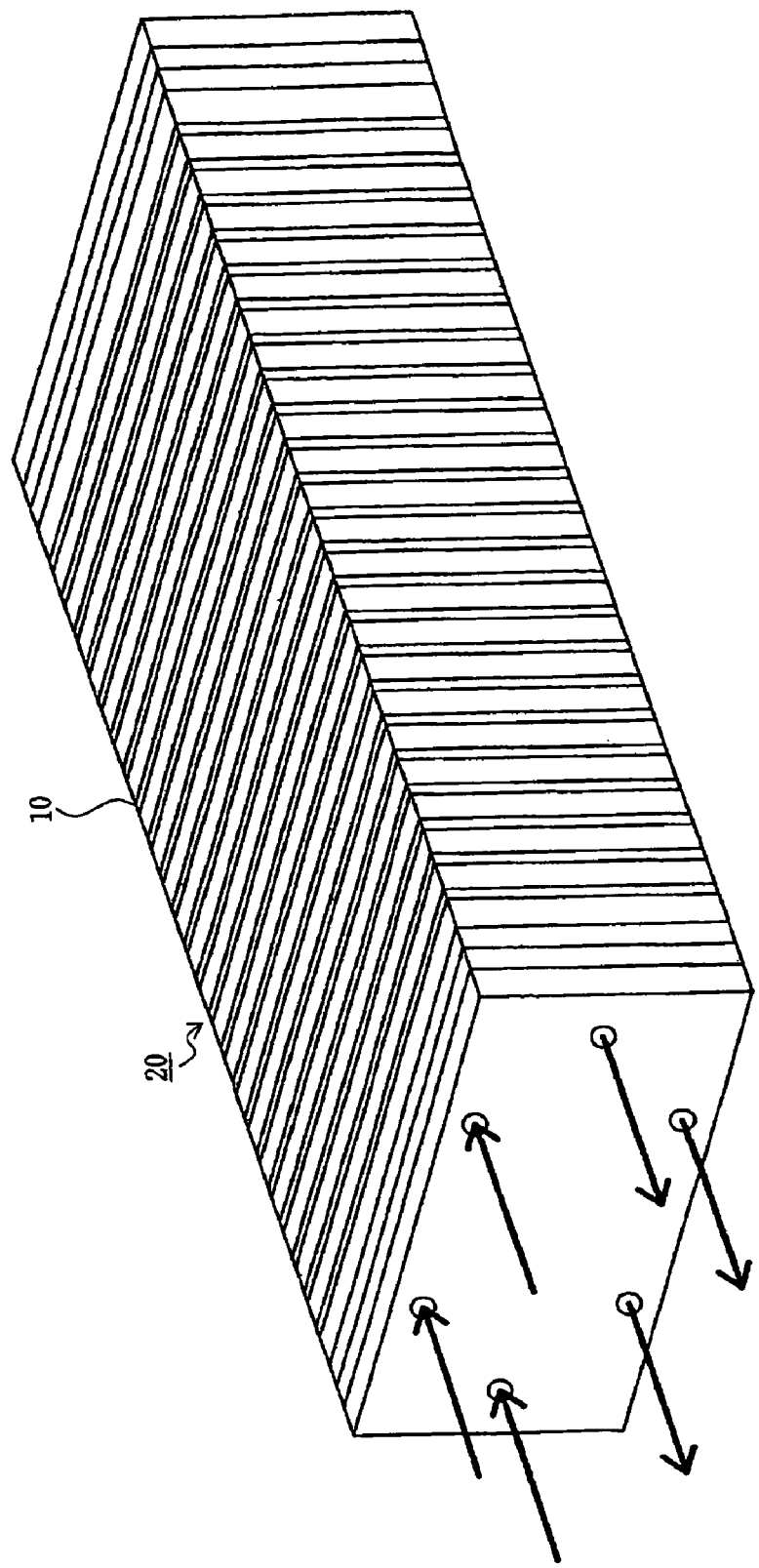
FIG. 4 is a perspective view that represents the structure of a fuel cell stack according to the first embodiment of the invention.

FIG. 2 is a diagram that represents a structure of a fuel cell system according to a first embodiment of the invention. FIG. 3 is a block diagram that represents a structure of a control system of the fuel cell system according to the first embodiment of the invention. FIG. 4 is a perspective view that represents a structure of a fuel cell stack according to the first embodiment of the invention.

FIGS. 2 and 4 show a fuel cell stack 20 serving as a fuel cell (FC) that is used as a power source for vehicles including cars, buses, trucks, passenger carts, luggage carts and the like. Such vehicles are provided with a large number of power consuming accessories such as a light unit, a radio and a power window, which are used even when the vehicles are parked. The power source is required to provide a substantially wide range of outputs to cope with various operation patterns. Preferably the fuel cell stack 20 serving as the power source is used with a secondary battery serving as an electric storage device (not shown).

Preferably the fuel cell stack 20 is formed as a proton-exchange membrane fuel cell (PEMFC), although it may be alkaline solution fuel cell (AFC), a phosphoric acid fuel cell (PAFC), a molten carbonate fuel cell (MCFC), a solid oxide fuel cell (SOFC), a direct methanol fuel cell (DMFC) or the like.

More specifically, in the proton exchange membrane fuel cell (PEMFC or PEM), the hydrogen gas is used as the fuel, and oxygen or air is used as the oxidizer. The fuel cell of PEM type includes a stack formed by bonding a plurality of fuel cells in series, each having catalysts, electrodes and separators provided at both sides of the solid polymer electrolyte membrane that allows permeation of ions such as protons or the like.

According to the present embodiment, the fuel cell stack 20 includes a plurality of cell modules 10 as shown in FIG. 4. Each arrow shown in FIG. 4 represents the flow direction of the coolant in a closed cooling system among a plurality of systems for cooling the fuel cell stack 20. The cell module 10 is formed of a plurality of sets stacked in the thickness direction (the direction of a diagonal line connected between the lower left and the upper right of FIG. 4). Each of those sets includes a unit cell (MEA) 11 to be described later with respect to the fuel cell, a separator unit 12 (also described later) that electrically connects the unit cells 11 and separates a passage of the hydrogen gas introduced to the unit cell 11 from the passage of air, and a frame (not shown) that supports the unit cell 11 and the separator unit 12.

FIG. 2 is a view of the device that supplies hydrogen gas as the fuel gas and air as the oxidizer to the fuel cell stack 20. Note that the hydrogen gas obtained by reforming methanol, gasoline or the like with the reforming device (not shown) may be directly supplied to the fuel cell stack 20 as the fuel gas. However, it is preferable to supply the hydrogen gas stored in a fuel storage unit 73 so that sufficient quantity of hydrogen gas can be supplied stably even in a high load operation state of the vehicle. This makes it possible to supply sufficient quantity of hydrogen gas substantially at a constant pressure. Accordingly, the fuel cell stack 20 is capable of supplying the required electricity in response to change in the vehicle load without delay. In this case, the output impedance of the fuel cell stack 20 may be made extremely low with the approximation to 0.

The hydrogen gas flowing from the fuel storage unit 73 including a container that stores a hydrogen storing alloy, a container that stores a hydrogen storing liquid such as decalin, and a hydrogen gas cylinder passes through a first fuel supply passage 21 as a fuel supply pipe and a second fuel supply passage 33 connected to the first fuel supply passage 21 as a fuel supply pipe to be supplied to the fuel chamber of the fuel cell stack 20. The first fuel supply passage 21 is provided with a switching valve 24 for the fuel storage unit, hydrogen pressure sensors 27, 28 serving as the pressure sensor for detecting the hydrogen gas pressure, hydrogen supply pressure regulating valves 25a, 25b for regulating the pressure of the supplied hydrogen gas, and an electromagnetic valve 26 for fuel supply.

The fuel storage unit 73 has the sufficient capacity and capability of supplying the hydrogen gas constantly at a sufficiently high pressure. In the example shown in FIG. 2, three fuel storage units 73, for example, are provided. The first fuel supply passage 21 is branched into a plurality of portions at the point to which the respective fuel storage units 73 are connected, and the branched passages are joined at the intermediate portion. However, single fuel storage unit may also be employed. The number of the fuel storage units may be arbitrarily determined.

The hydrogen gas flowing out of the fuel chamber of the fuel cell stack 20 passes through a fuel discharge passage 31 so as to be discharged outside the fuel cell stack 20. The fuel discharge passage 31 is provided with a water collecting drain tank 60 as a collecting container. The water collecting drain tank 60 is connected to a fuel discharge passage 30 that discharges water and the separated hydrogen gas. The fuel discharge passage 30 is provided with a suction circulating pump 36 as a forcible fuel discharge device. At an end portion of the fuel discharge passage 30 opposite to the water collecting drain tank 60 is connected to the second fuel supply passage 33. The hydrogen gas introduced outside the fuel cell stack 20 is collected so as to be supplied to the fuel chamber of the fuel cell stack 20 for reusing purposes.

The water collecting drain tank 60 is connected to a fuel discharge passage 56 that is provided with a hydrogen discharge valve 62 through which the hydrogen gas discharged from the fuel chamber upon start-up of the fuel cell stack 20 is discharged into atmosphere. The fuel discharge passage 56 may be provided with a hydrogen combustion device if necessary, in which the discharged hydrogen gas is combusted so as to discharge resultant water into atmosphere.

The hydrogen supply pressure regulating valves 25a and 25b may be a butterfly valve, a regulator valve, a diaphragm valve, a mass flow controller, a sequential valve or the like. However, they may be of any type so long as the pressure of the hydrogen gas flowing from outlets of the hydrogen supply pressure regulating valves 25a, 25b can be regulated to a predetermined pressure. The pressure may be manually adjusted. However, it is preferably adjusted by an actuator including an electric motor, a pulse motor, an electromagnet or the like. The fuel supply electromagnetic valve 26 and the hydrogen discharge valve 62 are of ON/OFF switching type, which are operated by the actuator including the electric motor, the pulse motor, the electromagnet or the like. The switching valve 24 for the fuel storage unit is operated manually or automatically with the electromagnetic valve. The suction circulation pump 36 may be of any type so long as the hydrogen gas is forcibly discharged so that the inside of the fuel chamber is brought into a negative pressure state.

Air serving as the oxidizer flowing from an air supply fan 75 as an oxidizer supply source passes through an oxidizer supply passage 76 so as to be supplied to an oxygen chamber of the fuel cell stack 20. An air cylinder and an air tank may be employed as the oxidizer supply source in place of the air supply fan 75. Oxygen may be used as the oxidizer in place of air. Air discharged from the oxygen chamber passes through an exhaust manifold 77 so as to be discharged into atmosphere.

Water may be sprayed into air supplied to the oxygen chamber from the air electrode of the fuel cell stack 20 for the purpose of maintaining the unit cells 11 in a wet state. In this case, water supplied from a water tank is sprayed into air through a water supply nozzle provided at the intermediate portion of the oxidizer supply passage 76 or at the inlet of the oxygen chamber of the fuel cell stack 20. Preferably a condenser may be provided at an intermediate portion of the exhaust manifold 77 or the like where water contained in the air discharged from the oxygen chamber is collected and reused.

Air supplied to the oxygen chamber of the fuel cell stack 20 may be in a state where the atmospheric pressure is kept or in a pressurized state where the pressure is higher than the atmospheric pressure. In the present embodiment, description will be given, in which the air is at the atmospheric pressure. That is, in the embodiment, the fuel cell system is the one operated at the atmospheric pressure rather than the system under pressure.

FIG. 2 shows a device as a closed cooling system as one of those for cooling the fuel cell stack 20. The fuel cell stack 20 is connected to a coolant supply passage 53 through which the coolant supplied to the fuel cell stack 20 passes and a coolant discharge passage 71 through which the coolant discharged from the fuel cell stack 20 passes. A coolant storage container 52 is connected to each end of the coolant supply passage 53 and the coolant discharge passage 71 opposite to the fuel cell stack 20. The coolant supply passage 53 is provided with a coolant supply pump 54 as a coolant pump and a filter 55. The coolant discharge passage 71 is provided with a radiator 72 as a cooling device for cooling the coolant and a coolant discharge pump 51 as the coolant pump. The coolant in the embodiment may be water, however, it may be antifreeze solution or any other fluid. The coolant discharge pump 51 and the coolant supply pump 54 may be of any type so long as it admits the coolant such as water so as to be discharged therethrough. The filter 55 may be of any type so long as it serves to remove dust, impurities and the like contained in the coolant such as water.

The coolant supplied to the fuel cell stack 20 passes through the coolant passage 45 within the separator base 41 (to be described later) of the separator unit 12 in each of the cell modules 10 so as to be cooled. In this case, the coolant circulates within a substantially closed cooling system formed by connecting the coolant storage container 52, the coolant supply passage 53, the fuel cell stack 20, and the coolant discharge passage 71, and is never brought into contact with the unit cells 11. As a result, the coolant is not brought into contact with such members as the solid polymer electrolyte membrane, catalyst, electrodes and the like. Therefore, the coolant with the content that may adversely affect the members included in the unit cell 11, such as the antifreeze solution, may be used.

The hydrogen gas supplied to the fuel chamber of the fuel cell stack 20 and air supplied to the oxygen chamber also have a function of cooling the fuel cell stack 20. The device for supplying hydrogen gas as the fuel gas and air as the oxidizer to the fuel cell stack 20 functions as one of the cooling systems for cooling the fuel cell stack 20. As the hydrogen gas and air are consumed and discharged to the outside, the device for supplying the hydrogen gas and air may be considered as an open cooling system. In this case, the hydrogen gas and air pass through the cell module 10 so as to be cooled while contacting with such members as the solid polymer electrolyte membrane, catalyst, and electrode that are included the unit cell 11. As described above, if water is supplied into air supplied to the oxygen chamber, the cooling capability is enhanced.

The fuel cell stack 20 is provided with a voltmeter 78 that measures the terminal voltage of the electrical terminal (not shown), and an exhaust air temperature sensor 74 that detects the temperature of air circulating within the fuel cell stack 20, or a temperature of air discharged from the fuel cell stack 20. The coolant storage container 52 and the water collecting drain tank 60 are provided with water level sensors 52a and 60a for detecting the water level, respectively.

Generally, a lead storage battery, a nickel/cadmium battery, a nickel hydride battery, a lithium-ion battery, a sodium sulfur battery may be employed as the electric storage device in the form of the secondary battery. However, the electric storage device is not limited to the battery and may be of any form so long as it has a function of electrically storing and discharging the energy, for example, the capacitor (condenser) such as an electrical double layer capacitor, a fly wheel, a superconductive coil, or a pressure reservoir. One of the aforementioned electric storage devices or a plurality thereof may be used independently or in combination.

The fuel cell stack 20 applies the electric current to the load (not shown) connected thereto. The load herein generally refers to an inverter unit serving as a drive control unit which converts the direct current from the fuel cell stack 20 or the electric storage device into the alternate current so as to be supplied to a drive motor for rotating the wheels of the vehicle. The drive motor herein also functions as a generator, which generates a so called regenerative electric current in a deceleration state of the vehicle. In this case, the drive motor is rotated by the wheels of the vehicle to generate electric power, which functions as a braking unit of the vehicle for applying the braking force to the wheels. The regenerative electric current is supplied to the electric storage device to be charged therein.

In the embodiment, the fuel cell system includes a control unit as shown in FIG. 3. Referring to a block diagram of FIG. 3, a control unit 81 is a computer that includes a calculation unit such as CPU or MPU, an input/output interface, and the like for controlling operations of the fuel cell system. The control unit 81 is connected to a memory 82 as a data storage unit such as an electromagnetic disk or a semiconductor memory. The control unit 81 is connected to the voltmeter 78, the water level sensors 52a and 60a, the hydrogen pressure sensors 27 and 28, the exhaust air temperature sensor 74, and a hydrogen concentration sensor 83 that detects the concentration of the hydrogen gas discharged from the fuel chamber of the fuel cell stack 20. Various outputs from those devices are input to the control unit 81. The hydrogen supply pressure regulating valves 25a and 25b, the hydrogen discharge valve 62, the air supply fan 75, the coolant supply pump 54 and the coolant discharge pump 51 as the coolant pump, and an alarm 86 that outputs an alarm upon failure and accident in the fuel cell system may be connected to the control unit 81 for controlling operations thereof.

Next, a structure of the separator unit 12 will be described in detail.

Figure 5:
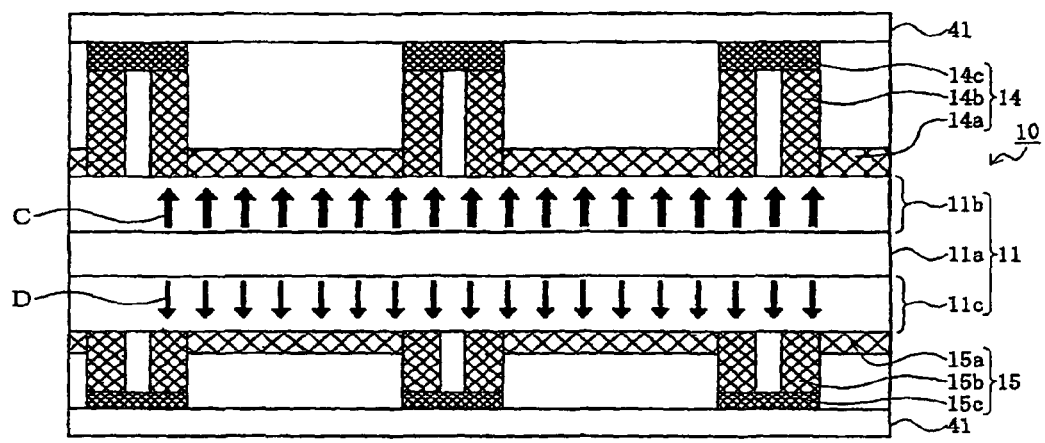
FIG. 5 is a sectional view of a cell module of the fuel cell system according to the first embodiment of the invention.
Figure 6:
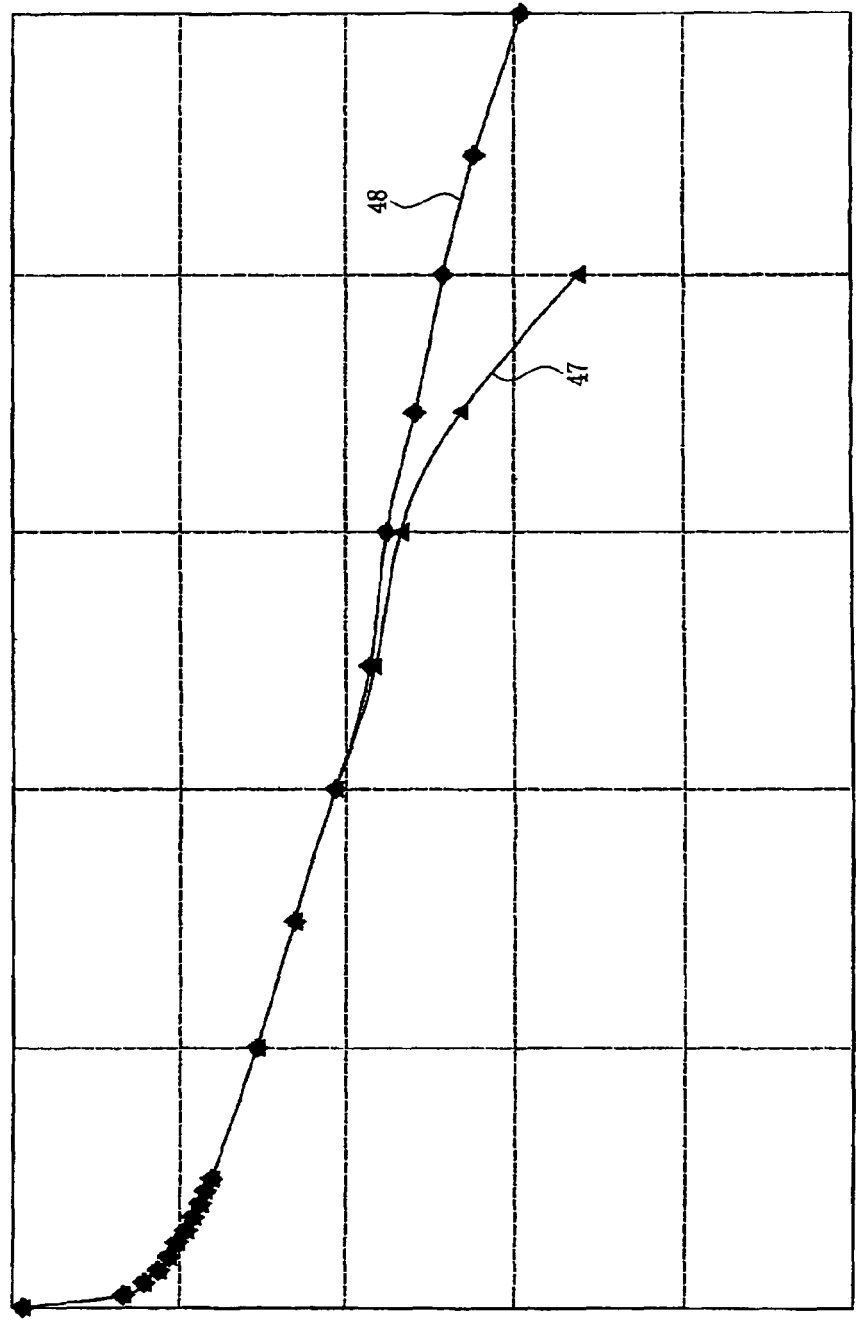
FIG. 6 is a graph that represents a power generating performance of the fuel cell system according to the first embodiment of the invention.

FIG. 1 is a view representing a structure of the separator unit of the fuel cell system according to the first embodiment of the invention. FIG. 5 is a sectional view representing a structure of the cell module of the fuel cell system according to the first embodiment of the invention. FIG. 6 is a graph representing the power generation performance of the fuel cell system according to the first embodiment of the invention.

Referring to FIGS. 1 and 5, a plurality of the cell modules 10 are stacked, each has a unit cell 11 and a separator unit 12. The separator unit 12 electrically connects the adjacent unit cells 11, and separates an oxygen chamber as a passage through which air flows and a fuel chamber as a passage through which the hydrogen gas introduced into the unit cell 11 flows. FIG. 1 is a perspective view that represents an enlarged portion of the stacked cell modules 10. FIG. 5 is a sectional view that represents an enlarged portion of the stacked cell modules 10. The frame that supports the unit cells 11 and the separator unit 12 are not shown for the purpose of simplifying the explanation.

Referring to FIG. 5, the unit cell 11 is formed of a solid polymer electrolyte membrane 11a as an electrolyte layer of an ion-exchange membrane, an air electrode 11b (cathode electrode) as an oxygen electrode provided at one side of the solid polymer electrolyte membrane 11a, and a fuel electrode 11c (anode electrode) provided at the other side of the solid polymer electrolyte membrane 11a. The air electrode 11b and the fuel electrode 11c include electrode diffusion layers each formed of a conductive material that allows diffusion and permeation of the reactant gas, and catalytic layers formed on the electrode diffusion layer including the catalytic substance supported in contact with the solid polymer electrolyte membrane 11a, respectively. The solid polymer electrolyte membrane 11a, the air electrode 11b and the fuel electrode 11c are not shown in FIG. 1.

The separator unit 12 is formed of a separator base 41 serving as a gas block member between the unit cells 11, a collector 14 at the air electrode side, serving as a mesh-like collector, which is provided at one side of the separator base 41 for collecting electricity in contact with the electrode diffusion layer at the air electrode 11b of the unit cell 11 and provided with a plurality of openings that allow permeation of an air/water mixture, and a collector 15 at the fuel electrode side, serving as a mesh-like collector, which is provided at the other side of the separator base 41 for feeding electricity to the outside in contact with the electrode diffusion layer at the fuel electrode 11c of the unit cell 11. The collector 15 at the fuel electrode side is not shown in FIG. 1 for convenience of explanation.

Each of the collector 14 at the air electrode side and the collector 15 at the fuel electrode side is formed of a conductive plate material, for example, a thin metal plate having a thickness of about 0.2 mm. The separator base 41 is a plate-like member formed of a thin metal plate having a thickness smaller than those of the collectors. For example, it has a dual structure including a first plate member 41a and a second plate member 41b having a coolant passage 45 formed therein. The collectors 14 and 15 at the air electrode and the fuel electrode sides, and the separator base 41 may be formed by subjecting the metal that exhibits conductivity and anti-corrosion property such as a stainless steel, nickel alloy and titanium alloy to an anti-corrosion conductive treatment such as gold plating.

The collector 14 at the air electrode having substantially a rectangular shape with a long length in a lateral direction is formed of a porous body. The porous body is formed of a metal plate material with mesh-like openings of the aperture ratio of 59% or higher, such as an expand metal and a punching metal. The above-described metal plate is formed into a corrugated plate provided with thin extending projections formed through a press working process. Each of the projections has a side wall portion 14b and a tip portion 14c. The projections extend in the longitudinal direction of the plate material, that is, in the vertical direction in FIG. 5, which are arranged in parallel at equal intervals so as to be formed over the plate surface completely. The cross section of the projection is formed into a substantially corrugated rectangular shape, having a base portion with slightly wider width resulting from punching out in the course of the press working. The height of the projection is substantially the same as the thickness of the frame (not shown) such that an air passage with a predetermined opening area is formed to longitudinally pierce through the portion between the electrode diffusion layer at the air electrode 11b of the unit cell 11 and the side surface of the separator base 41 in the stack state. Referring to FIG. 1, an arrow A represents the flow of air introduced into the unit cell 11 to flow through the oxygen chamber. The flat surface of the tip portion 14c of the projection abuts against the surface of the separator base 41, and a flat surface of a base portion 14a of the projection abuts against the electrode diffusion layer at the side of the air electrode 11b of the unit cell 11.

The collector 15 at the fuel electrode side is formed of a porous body having the same size as that of the collector 14 at the air electrode side. The porous body is formed of a metal plate material with mesh-like openings such as an expand metal and a punching metal. The above-described metal plate is formed into a corrugated plate provided with thin extending projections formed through a press working process. Each of the projections has a side wall portion 15b and a tip portion 15c like the collector 14 at the air electrode side. The projections vertically extend as shown in FIG. 5, and arranged in parallel at equal intervals so as to be formed over the plate surface completely. The cross section of the projection is formed into a substantially corrugated rectangular shape, having a base portion with slightly wider width resulting from punching out in the course of the press working. The height of the projection is substantially the same as the thickness of the frame (not shown) such that a fuel gas passage with a predetermined opening area is formed to longitudinally pierce through the portion between the electrode diffusion layer at the fuel electrode 11c of the unit cell 11 and the side surface of the separator base 41 in the stack state. The flat surface of the tip portion 15c of the projection abuts against the side surface of the separator base 41, and a flat surface of a base portion 15a of the projection abuts against the electrode diffusion layer at the side of the fuel electrode 11c of the unit cell 11.

The collectors 14 and 15 at the air electrode and the fuel electrode sides are arranged to interpose the separator base 41 therebetween with the respective base portions 14a and 15a placed outward. The respective tip portions 14c and 15c of the projections of the collectors 14 and 15 at the air electrode and the fuel electrode sides abut against the separator base 41 so as to allow application of electric current therebetween. The air passage, that is, oxygen chamber at one side of the separator base 41 and the fuel gas passage, that is, the fuel chamber at the other side thereof may be formed by stacking the collectors 14 and 15 at the air electrode and the fuel electrode sides, having the separator base 41 interposed therebetween. Air is supplied from the oxygen chamber into the air electrode 11b of the unit cell 11, and likewise, the hydrogen gas is supplied from the fuel chamber into the fuel electrode 11c of the unit cell 11.

Water is allowed to flow through the unit cell 11. When the hydrogen gas as the fuel gas is supplied into the fuel chamber provided with the collector 15 at the fuel electrode side, hydrogen is decomposed into hydrogen ions (proton) and electrons. The hydrogen ion permeates the solid polymer electrolyte membrane 11a together with carrier water. In the case where the air electrode 11b serves as the cathode electrode and air as the oxidizer is supplied into the oxygen chamber, oxygen contained in air is bonded to the hydrogen ion and the electron to generate water. The water content permeates the solid polymer electrolyte membrane 11a as back diffusion water to flow into the fuel chamber. The back diffusion water refers to water generated in the oxygen chamber that diffuses within the solid polymer electrolyte membrane 11a, and permeates therethrough in the direction reverse to that of the hydrogen ion to reach the fuel chamber.

The separator base 41 is connected to a coolant inlet pipe and a coolant outlet pipe. The coolant that enters through the coolant inlet pipe passes through the coolant passage 45 formed within the separator base 41 for cooling, and discharged through the coolant outlet pipe. The coolant used to flow through the closed cooling system is supplied to the fuel cell stack 20 through the coolant supply passage 53 so as to flow into the coolant inlet pipe through the passage (not shown) formed within the fuel cell stack 20. The coolant discharged through the coolant outlet pipe enters into the coolant discharge passage 71 through the passage (not shown) in the fuel cell stack 20 so as to be discharged therefrom. The coolant passage 45 may be formed into a straight, serpentine or whorl shape with the increased length.

Referring to FIG. 1, the separator base 41 is formed by bonding the first plate member 41a and the second plate member 41b together. In this case, a groove with an arbitrary shape is formed in the inner surface of the second plate member using a photolithograpy technique such as chemical etching. The first plate member 41a is then stacked on the grooved surface of the second plate member 41b to form the separator base 41 having the coolant passage 45 therein. In this case, as both side surfaces of the separator base 41 are bonded at the respective points for the purpose of improving the conductivity in the portion therebetween. Preferably the outer surfaces of the separator base 41 are flat with no irregularity. This ensures to make the outer surface of the separator base 41 in contact with the tip portions 14c and the 15c of the collectors 14 and 15 at the air electrode and the fuel electrode sides, thus improving the heat conductance and electric conductivity therebetween.

In the first embodiment, each of the collectors 14 and 15 at the air electrode and the fuel electrode sides is formed such that the aperture ratio is locally varied. For example, they are formed such that each of the base portions 14a and 15b, that is, the electrode abutment portion that abuts against the unit cell 11 as the MEA contact portion has the highest aperture ratio, each of the tip portions 14c and 15c, that is, the separator abutment portion that abuts against the separator base 41 as the separator contact portion has the lowest aperture ratio, and each of the side wall portions 14b and 15b as a rib forming portion has the aperture ratio in the range between those of the 14a, 15a and the 14c, 15c. Each of the aperture ratio of the side wall portions 14b and 15b may be set to the value equal to that of the tip portion 14c or 15c. That is, the aperture ratio at the respective areas of the collectors 14 and 15 at the air electrode side and the fuel electrode side is set to be graded in the stack direction (vertical direction shown in FIG. 5) of the unit cell 11, and varies as defined by the following equation. Aperture ratio at MEA contact portion >aperture ratio at rib ≧aperture ratio at separator contact portion . . . (1)

Each of the collectors 14 and 15 at the air electrode and the fuel electrode sides has mesh-like apertures such that respective flows of the hydrogen gas within the fuel chamber and air within the oxygen chamber are not interrupted by those collectors 14 and 15. The hydrogen within the fuel chamber and air within the oxygen chamber are sufficiently in contact with the electrode diffusion layers of the fuel electrode 11c and the air electrode 11b of the unit cell 11 through the openings of the base portions 14a and 15a in contact therewith. The hydrogen gas within the fuel chamber and air within the oxygen chamber are allowed to flow through the openings of the side wall portions 14b and 15b, thus facilitating smooth flow of the hydrogen gas in the fuel chamber and air in the oxygen chamber.

In the case where a water droplet is generated in the oxygen chamber owing to produced water or water supplied into air, and such droplet blocks the passage between the adjacent base portions 14a, air is allowed to flow into the adjacent passage through the openings formed in the side wall portion 14b with no interruption. The same effect may be obtained in the case where the droplet is generated in the fuel chamber owing to the back diffusion water.

The unit cells 11 are cooled by the separator base 41 serving as a radiator in a closed cooling system. The heat generated in the respective unit cells 11 is transferred to the separator base 41 through the collectors 14 and 15 at the air electrode and the fuel electrode sides, and further to the coolant that circulates within the separator base 41. The electricity generated in the respective unit cells 11 is also well transferred to the collectors 14 and 15 at the air electrode and the fuel electrode sides.

The heat generated in the unit cell 11 is transferred to the base portions 14a and 15a from the outer surfaces of the air electrode 11b and the fuel electrode 11c, and further to the separator base 41 from the tip portions 14c and 15c through the side wall portions 14b and 15b. Assuming that each of the aperture ratios of the collector 14 and 15 at the air electrode and the fuel electrode sides is kept constant at all the areas, the heat conductance in each of the collectors 14 and 15 at the air electrode and the fuel electrode sides becomes constant at all areas. In this case, as areas of the base portions 14a and 15a are larger than those of the tip portions 14c and 15c, the heat energy per unit area transferred to the tip portions 14c and 15c becomes larger than those transferred to the base areas 14a and 15a. As a result, the thermal resistance at the tip portions 14c and 15c become greater than that at the base portions 14a and 15a. As the aperture ratio increases, the heat conductance at the side wall portions 14b and 15b is lowered, thus increasing the thermal resistance. Especially when water is supplied into air, the side wall portions 14b and 15b function as cooling fins as the radiator. Since the aperture ratio increases, in this case, the area that allows the side wall portions 14b and 15b to serve as the cooling fins is reduced, thus increasing the thermal resistance. When each thermal resistance of the base portions 14a and 15a, and the side wall portions 14b and 15b increases, the temperature distribution occurs in the stack direction of the unit cell 11 as described above. This may increase temperatures of the air electrode 11b and the fuel electrode 11c. Therefore the quantity of water that dissipates to the outside of the unit cell 11 through the air electrode 11b and the fuel electrode 11c becomes excessive to lower the humidity within the unit cell 11. This may reduce the power generation efficiency in the unit cell 11.

In the embodiment, each aperture ratio of the collectors 14 and 15 at the air electrode and the fuel electrode sides is graded in the stack direction of the unit cells 11, and varies as defined in the equation (1). Since each of the tip portions 14c and 15c has a low aperture ratio, and a high area density, the heat energy per unit area that can be transferred is increased, and the thermal resistance is reduced. Each of the side wall portions 14b and 15b also has the low aperture ratio and the high area density. Accordingly the heat energy per unit area that can be transferred is increased, and the thermal resistance is reduced. This may eliminate the temperature distribution in the stack direction of the unit cells 11, and accordingly, each temperature of the air electrode 11b and the fuel electrode 11c is not increased. This makes it possible to suppress each quantity of water that dissipates to the outside of the unit cell 11 through the air electrode 11b as shown by an arrow C in FIG. 5 and of water that dissipates to the outside of the unit cell 11 through the fuel electrode 11c as shown by an arrow D in FIG. 5. The humidity within the unit cell 11 may be appropriately maintained and the power generation efficiency in the unit cell 11 may also be improved.

FIG. 6 is a graph that represents the power generating performance that changes in accordance with the aperture ratio of the collector 14 at the air electrode side and the collector 15 at the fuel electrode side under the low humidity condition, that is, in the state where the unit cell 11 is in the relatively dry state. Referring to FIG. 6, the y-axis represents the voltage of the unit cell 11, and the x-axis represents the current density. Line 47 formed by plotting the filled triangle marks as the experimental results represents the case where each aperture ratio of the collectors 14 and 15 at the air electrode and the fuel electrode sides is kept constant for all areas. Line 48 formed by plotting the filled square marks as the experimental results represents the case where each aperture ratio of the collectors 14 and 15 at the air electrode and the fuel electrode sides is graded in the stack direction of the unit cell 11, and varies as defined in the equation (1). As shown in FIG. 6, in the case where each aperture ratio of the collectors 14 and 15 at the air electrode and the fuel electrode sides is graded in the stacked direction of the unit cell 11, and varies as defined in the equation (1), the power generation efficiency in the unit cell 11 is improved.

Since each of the collectors 14 and 15 at the air electrode and the fuel electrode sides has mesh-like openings, flows of the hydrogen gas within the fuel chamber and air within the oxygen chamber are not interrupted by those collectors 14 and 15, respectively. That is, the hydrogen gas within the fuel chamber and air within the oxygen chamber are sufficiently brought into contact with the electrode diffusion layers of the fuel electrode 11c and the air electrode 11b of the unit cell 11 through the openings of the base portions 14a and 15a in contact with the unit cell 11. Also, since the hydrogen gas within the fuel chamber and air within the oxygen chamber are allowed to flow through the openings of the side wall portions 14b and 15b, each flow of the hydrogen gas within the fuel chamber and air within the oxygen chamber becomes smooth. Especially in the case where a water droplet is generated in the oxygen chamber owing to produced water or water supplied into air, and such droplet blocks the passage between adjacent base portions 14a, air is allowed to flow into the adjacent passage through the openings of the side wall portion 14b without interruption. The same effect may be obtained in the case where the droplet is generated in the fuel chamber owing to the back diffusion water.

Next, operations of the fuel cell system with above structure will be described.

Figure 7:
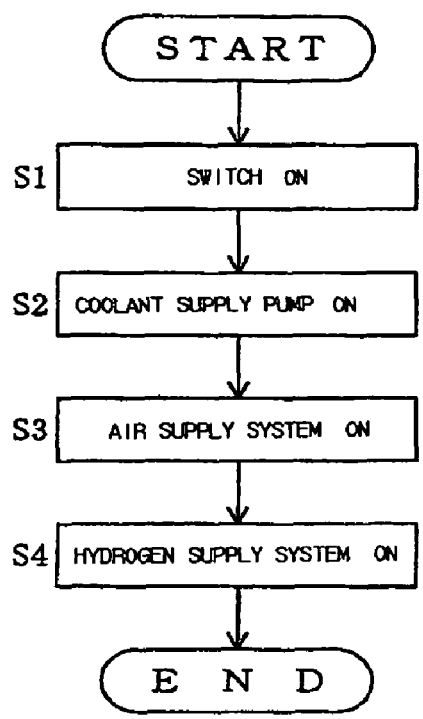
FIG. 7 is a flowchart that represents a process for starting the fuel cell system according to the first embodiment of the invention.
Figure 8:
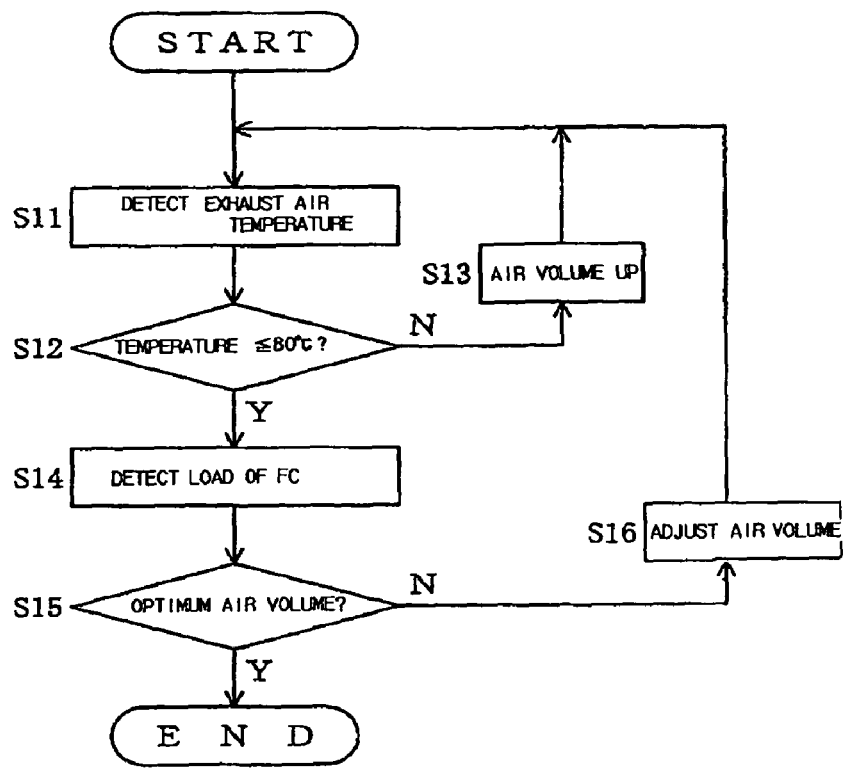
FIG. 8 is a flowchart that represents an air supply quantity control in the fuel cell system according to the first embodiment of the invention.

FIG. 7 is a flowchart that represents a start-up operation of the fuel cell system according to the first embodiment of the invention. FIG. 8 is a flowchart that represents an air supply quantity control for the fuel cell system according to the first embodiment of the invention.

The process for the start-up operation will be described. In step S1, a start switch (not shown) is turned ON by an operator for starting the fuel cell system. Then in step S2, the coolant supply pump 54 and the coolant discharge pump 51, that is, the coolant pump is turned ON. The coolant starts circulating by flowing through the coolant passage 45 within the separator base 41. Then in step S3, the device for supplying air as the oxidizer to the fuel cell stack 20, that is, the air supply system is turned ON. In this case, the control is executed to maximize the quantity of air supplied by the air supply fan 75 such that no abnormal reaction occurs in the unit cell 11 of the fuel cell stack 20. Then in step S4, the device for supplying hydrogen gas as the fuel gas to the fuel cell stack 20, that is, the hydrogen supply system is turned ON. The start-up operation, thus, ends. The fuel cell system operation transfers into the normal operation phase such that the electricity generated by the fuel cell stack 20 is supplied to the loads or the secondary battery.

In the case where the fuel cell system is provided with a device for spraying water into air supplied into the oxygen chamber, it is preferable to start supplying water into air supplied into the oxygen chamber before the hydrogen supply system is turned ON. Otherwise, the abnormal combustion may be caused by the supply of the hydrogen gas to the solid polymer membrane 11a in a dry state, since air is present within the unit cell 11 at the time of start-up of the fuel system, irrespective of whether the air supply system is ON or not. The air electrode 11b of the unit cell 11 has to be preliminarily brought into a wet state by supplying water before supply of the hydrogen gas so as not to damage the unit cell 11 in the case where the abnormal heat is generated due to the abnormal combustion. The abnormal heat may be converted into the evaporative heat such that the moistening of the solid polymer electrolyte membrane 11a is facilitated, thereby preventing the damage exerted to the unit cell 11.

After the start-up routine ends, the control of hydrogen gas supply quantity, air supply quantity, water supply quantity will be executed simultaneously. Under the control of hydrogen gas supply quantity, the hydrogen supply pressure regulating valves 25a and 25b are adjusted such that the hydrogen gas is supplied to the fuel electrode 11c at a predetermined concentration equal to the explosive limit or lower. The hydrogen discharge valve 62 which is closed during start-up is opened based on the predetermined rule so as to discharge the fuel gas at the reduced hydrogen partial pressure for refreshing the atmospheric gas of the fuel electrode 11c. The predetermined rule as described above is stored in the memory 82 which is referred upon execution of the regulation of the hydrogen supply pressure regulation valves 25a and 25b, and switching operation of the hydrogen discharge valve 62 by the controller 81. The hydrogen discharge valve 62 is appropriately opened during the operation to stabilize the voltage. The hydrogen discharge valve 62 is opened on the grounds that if the fuel cell system is operated while keeping the hydrogen discharge valve 62 closed, the partial pressure of the hydrogen consumed by the fuel electrode 11c is gradually decreased under the influence of $N_2$, $O_2$ or the produced water permeating the air electrode 11b, and the output voltage of the fuel cell stack 20 is reduced, accordingly.

Under the air supply quantity control, first in step S11, the temperature of air immediately after discharged from the fuel cell stack 20 is detected by the exhaust air temperature sensor 74. Then in step S12, the control unit 81 determines whether the detected temperature of the discharged air is equal to or lower than 80° C. If it is determined that the temperature of the discharged air is not equal to or lower than 80° C., that is, exceeds 80° C., the process proceeds to step S13 where an air volume is increased by the control unit 81 so as to prevent burning of the unit cell 11. More specifically, air supply quantity is increased by increasing the rotating speed of the air supply fan 75 so as to reduce the temperature of the air electrode 11*b* serving as the heat source.

Meanwhile if it is determined that the temperature of the discharge air is equal to or lower than 80° C., the process proceeds to step S14 where the load of the fuel cell stack 20, that is, the load of the fuel cell, is detected. Then in step S15, the control unit 81 determines whether the air supply quantity, that is, air volume, is appropriate. In this case, the determination is made by referring to the table of the relationship between the load of the fuel cell stack 20 and the air volume required in the respective states, which is stored in the memory 82. If it is determined that the air volume is inappropriate, the control unit 81 adjusts the air volume in step S16. More specifically, the rotating speed of the air supply fan 7 is adjusted to control the air volume. If it is determined that the air volume is appropriate, the process ends.

Under the hydrogen gas supply quantity control, the hydrogen gas pressure at the fuel storage unit 73 is detected by the hydrogen pressure sensors 27 and 28. The control unit 81 regulates the hydrogen supply pressure regulating valves 25*a* and 25*b*, thereby adjusting the pressure of the hydrogen gas supplied to the fuel cell stack 20 to a predetermined value. The control unit 81 controls a switching operation of the fuel supply electromagnetic valve 26 so as to control the hydrogen gas supply to the fuel cell stack 20. The fuel supply electromagnetic valve 26 may be closed for cutting the supply of the hydrogen gas to the fuel cell stack 20.

In the embodiment, each aperture ratio of the collectors 14 and 15 at the air electrode and the fuel electrode sides locally varies so as to be graded in the stack direction of the unit cells 11. This may eliminate the temperature distribution in the stack direction of the unit cells 11, and prevent the increase in temperatures of the air electrode 11*b* and the fuel electrode 11*c*. This makes it possible to suppress quantity of water that dissipates to the outside of the unit cell 11 through the air electrode 11*b* and the fuel electrode 11*c*. The humidity within the unit cell 11 may be appropriately maintained to enhance the power generation efficiency of the unit cell 11.

As the collectors 14 and 15 at the air electrode and the fuel electrode sides have mesh-like openings, each flow of the hydrogen gas within the fuel chamber and air within the oxygen chamber is not interrupted by those collectors 14 and 15. That is, the hydrogen gas within the fuel electrode and air within the oxygen chamber are sufficiently brought into contact with the electrode diffusion layers at the fuel electrode 11*c* and the air electrode 11*b* through openings of the base portions 14*a* and 15*a* in contact with the unit cell 11. The hydrogen gas within the fuel chamber and air within the oxygen chamber are allowed to flow through the openings of the side wall portions 14*b* and 15*b*, thus making flows of the hydrogen gas within the fuel chamber and air within the hydrogen chamber smooth. Especially, in the case where a water droplet generated in the oxygen chamber owing to produced water or water supplied into air blocks the passage between adjacent base portions 14*a*, air is allowed to flow into the adjacent passage through openings of the side wall portion 14*b* with no interruption. The same effect may be obtained in the case where the droplet is generated in the fuel chamber owing to the back diffusion water.

The embodiment only shows an example in which each aperture ratio of the collectors 14 and 15 at the air electrode and the fuel electrode sides is graded with respect to the stack direction of the unit cells 11 so as to eliminate the temperature distribution in the stack direction of the unit cells 11. However, the temperature distribution in the stack direction of the unit cells 11 may also be eliminated by forming the collectors 14 and 15 at the air electrode and fuel electrode sides using a combination of different materials. In this case, the material forming the collectors 14 and 15 at the air electrode and fuel electrode sides is partially changed such that the material forming the base portions 14*a* and 15*a* as the MEA contact portions in contact with the unit cell 11 has the lowest heat conductance, the material forming the tip portions 14*c* and 15*c* as the separator contact portions in contact with the separator base 41 have the highest heat conductance, and the material forming the side wall portions 14*b* and 15*b* as rib forming portions has the heat conductance in the range between those of the base portions 14a and 15a and the tip portions 14*c* and 15*c*. The heat conductance of the material forming the side wall portions 14*b* and 15*b* may be the same as that of the material forming the tip portions 14*c* and 15*c*. In this way, the thermal resistance at the respective areas of the collectors 14 and 15 at the air electrode and the fuel electrode sides may be graded in the stack direction of the unit cells 11, and changes as defined by the following equation (2): Thermal resistance of MEA contact portion >thermal resistance of rib portion ≧thermal resistance of separator contact portion . . . (2)

It should be noted that the invention is not limited to the above described embodiments, and may be modified into various forms without departing from the scope of the invention.

What is claimed is:

1. A separator unit inserted into a proton exchange membrane fuel cell operated at atmospheric pressure and having an electrolyte layer interposed between a fuel electrode and an oxygen electrode, comprising:
    a plate shaped separator base that separates hydrogen fuel gas supplied to the fuel electrode from oxygen or air oxidizing gas supplied to the oxygen electrode; and
    a corrugated expanded metal mesh collector provided with thin extending projections and having openings that form one of a passage through which the fuel gas flows and a passage through which the oxidizing gas flows, the collector being provided to at least one side of the separator base in abutment against one of the fuel electrode and the oxygen electrode, wherein:
    the separator base has coolant passages formed therein, through which a coolant is allowed to flow;
    an electrode abutment portion of the collector, which abuts against one of the fuel electrode and the oxygen electrode, has an aperture ratio higher than the aperture ratio of a portion other than the electrode abutment portion of the collector;
    each thin extending projection having a tip portion having a flat surface that abuts against a surface of the plate shaped separator base; and
    a flat surface of a base portion of the collector between each thin extending projection forms the electrode abutment portion and abuts against an electrode diffusion layer at a side of the fuel electrode or the oxygen electrode;
    wherein the collector includes a separator abutment portion defined by the flat surface of the tip portion that abuts against the separator base, and a rib portion between the electrode abutment portion and the separator abutment portion, each aperture ratio of which establishes the following relation:

aperture ratio of the electrode abutment portion > aperture ratio of the rib portion ≧ aperture ratio of the separator abutment portion; and wherein the thermal resistance of the electrode abutment portion > thermal resistance of the rib portion ≧ thermal resistance of the separator abutment portion, and wherein the electrode abutment, rib, and separator abutment portions of the collector are different materials having respectively different thermal resistances.

2. A separator unit according to claim 1 wherein the flat surfaces of the tip portions of the extending projections are aligned, the flat surfaces of the base portions are aligned spaced from the flat surfaces of the tip portions and the rib portions extend between and connect respective tip portions with respective base portions.

3. A separator unit according to claim 1 wherein the separator base blocks gas flow therethrough and wherein the separator base is a metal plate thinner than the collector.

4. A separator unit according to claim 2 wherein the separator base blocks gas flow therethrough and wherein the separator base is a metal plate thinner than the collector.

* * * * *